United States Patent
Tseng et al.

(10) Patent No.: US 10,956,167 B2
(45) Date of Patent: Mar. 23, 2021

(54) MECHANISM FOR INSTRUCTION FUSION USING TAGS

(71) Applicant: INTERNATIONAL BUSINESS MACHINES CORPORATION, Armonk, NY (US)

(72) Inventors: Jessica Hui-Chun Tseng, Fremont, CA (US); Manoj Kumar, Yorktown Heights, NY (US); Kattamuri Ekanadham, Mohegan Lake, NY (US); Jose E. Moreira, Irvington, NY (US); Pratap C. Pattnaik, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/434,134

(22) Filed: Jun. 6, 2019

(65) Prior Publication Data
US 2020/0387382 A1     Dec. 10, 2020

(51) Int. Cl.
*G06F 9/38*     (2018.01)
*G06F 12/0815*  (2016.01)
*G06F 9/30*     (2018.01)

(52) U.S. Cl.
CPC ........ *G06F 9/3853* (2013.01); *G06F 9/30043* (2013.01); *G06F 12/0815* (2013.01); *G06F 2212/1021* (2013.01)

(58) Field of Classification Search
None
See application file for complete search history.

(56) References Cited

U.S. PATENT DOCUMENTS

| | | | | |
|---|---|---|---|---|
| 5,465,377 A * | 11/1995 | Blaner | ................. | G06F 9/3885 |
| | | | | 712/23 |
| 6,889,318 B1 | 5/2005 | Wichman | | |
| 7,895,414 B2 * | 2/2011 | Sung | ..................... | G06F 9/3816 |
| | | | | 712/210 |
| 9,195,466 B2 * | 11/2015 | Brown | ............... | G06F 9/30043 |
| 9,329,848 B2 | 5/2016 | Lupon et al. | | |
| 2010/0299505 A1 * | 11/2010 | Uesugi | ............... | G06F 9/30181 |
| | | | | 712/221 |
| 2014/0047221 A1 * | 2/2014 | Irwin | ................. | G06F 9/30072 |
| | | | | 712/226 |
| 2016/0162406 A1 * | 6/2016 | Latorre | ............... | G06F 12/0815 |
| | | | | 711/122 |
| 2016/0313992 A1 * | 10/2016 | Gschwind | ............... | G06F 9/382 |

* cited by examiner

*Primary Examiner* — Eric Coleman
(74) *Attorney, Agent, or Firm* — Intelletek Law Group, PLLC; Gabriel Daniel, Esq.

(57) ABSTRACT

An instruction fusion system in which instructions are tagged with extra bits to specify the conditions by which the instructions can be fused is provided. A computing device receives a first instruction to be executed at a processor. The computing device receives a first fusion tag that corresponds to the first instruction, the first fusion tag specifying a condition for fusing the first instruction with another instruction. The computing device determines whether the first instruction is allowed to fuse with a second instruction based on the first fusion tag. When the first instruction is allowed to fuse with the second instruction, the computing device generates a fused instruction based on the first instruction and the second instruction. The computing device executes the fused instruction at the processor.

17 Claims, 8 Drawing Sheets

MECHANISM FOR INSTRUCTION FUSION USING TAGS

BACKGROUND

Technical Field

The present disclosure generally relates to computation by processors.

Description of the Related Arts

A processor can increase execution efficiency by fusing a group of in-flight instructions into a single internal operation, which are executed as one instruction. Instruction fusion may refer to a joining or combining of programming computation sequences into a single instruction.

SUMMARY

Some embodiments of the disclosure provide an instruction fusion system in which instructions are tagged with extra bits to specify the conditions by which the instructions can be fused. A computing device receives a first instruction to be executed at a processor. The computing device receives a first fusion tag that corresponds to the first instruction, the first fusion tag specifying a condition for fusing the first instruction with another instruction. The computing device determines whether the first instruction is allowed to fuse with a second instruction based on the first fusion tag. When the first instruction is allowed to fuse with the second instruction, the computing device generates a fused instruction based on the first instruction and the second instruction. The computing device executes the fused instruction at the processor.

In some embodiments, the computing device may modify the first fusion tag based on real-time condition of the processor. The second instruction may be identified based on the first fusion tag and a real-time condition at the processor.

In some embodiments, the computing device receives a second fusion tag that corresponds to the second instruction. The first fusion tag and the second fusion tag share an identifier of a group of instructions that includes both the first instruction and the second instruction. Alternatively, the first fusion tag allows the first instruction to be fused with another instruction sharing a same identifier.

The first fusion tag may prevent the first instruction from fusing with another instruction. The first fusion tag may specify that the first instruction is prevented from fusing with the second instruction if a wait time between the first instruction and the second instruction is greater than a threshold time interval. The first fusion tag may specify that if a load operation that the first instruction logically depends on results in a cache miss, the first instruction is prevented from fusing with another instruction. The first fusion tag may specify that instructions other than the first instruction have priority for instruction fusion and execution over the first instruction.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The fusion of instructions may result in more efficient execution of the computer program. However, some fused instructions may be more effective than others, while some fused instructions may hinder performance. Some embodiments of the disclosure provide an instruction fusion system in which instructions are tagged with extra bits to specify the conditions by which the instructions can be fused. A processor executing tagged instructions may use the fusion tags to determine which instructions may be fused, which instructions may not be fused, and which instruction is to be fused with which instruction, etc. The instruction fusion system may therefore use the fusion tags to maximize instruction fusion operations that increase execution efficiency while avoiding instruction fusion operations that hinder performance.

Instruction fusion may be performed by a mechanism that can be incorporated into a static compiler, a hardware unit in a core front-end to dynamically fuse sequences of instructions, a dynamic binary optimizer, or a Just-in-time (JIT) compiler, etc. The fusion tags may be set by a compiler that generates the instructions. The fusion tags may also be set by off-line profiling. The fusion tags may also set by real-time performance monitoring (PMU) in the processor that executes the instructions. The fusion tags may also be set by other internal or external agent (with respect to the processor).

Figure 1:
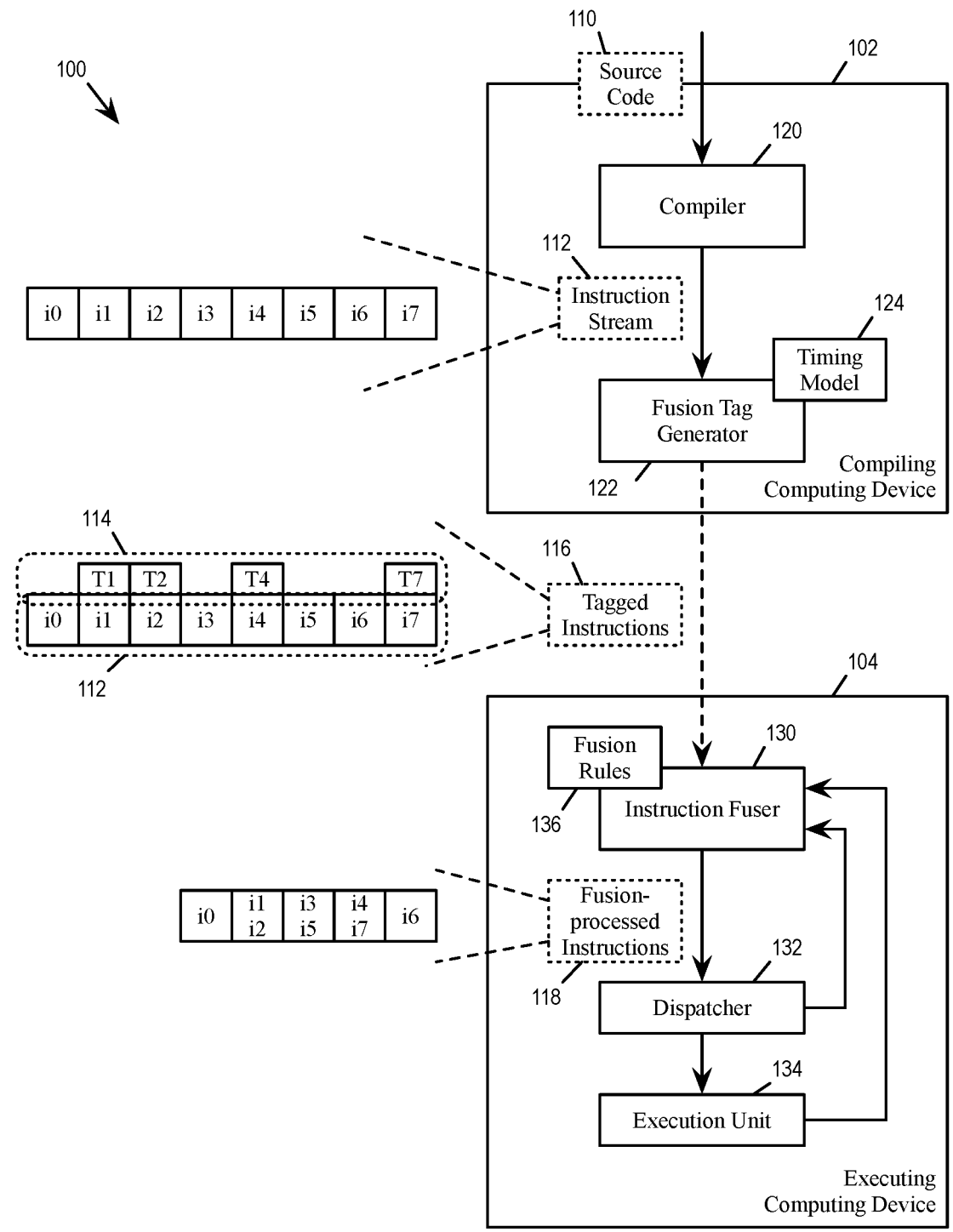
FIG. 1 illustrates an instruction fusion system that uses tags to specify the conditions by which the instructions can be fused, consistent with an exemplary embodiment.

For some embodiments, FIG. 1 illustrates an instruction fusion system 100 that uses tags to specify the conditions by which the instructions can be fused, consistent with an exemplary embodiment. As illustrated, the system 100 is implemented at a compiling computing device 102 and an execution computing device 104. The compiling computing device 102 compiles source code 110 into an instruction stream 112. The compiling computing device 102 also tags the instruction stream 112 with corresponding fusion tags 114 to create tagged instructions 116. The fusion tags 114 specify the condition by which the instructions can be fused. The tagged instructions 116 are delivered to the execution computing device 104, which uses the fusion tags 114 and other real-time conditions to determine which instructions can be fused with which instruction, and which instructions cannot be fused. The fusion operation produces fusion-processed instructions 118, which may include instructions that are fused and instructions that are not fused. The fusion-processed instructions 118 are then dispatched and executed. The execution computing device 104 may be a physically different device than the compiling computing device 102. The execution computing device 104 may also be a same physical device as the compiling computing device 102.

In some embodiments, fusion tags are extra bits that are appended to their corresponding instructions. In other words, each instruction has a corresponding fusion tag that accompanies the instruction through at least part of the data path or some of the pipeline stages. The fusion tag of an instruction may specify a condition by which the instruction can be fused. For example, the fusion tag may specify that the instruction is to be fused with another instruction sharing a particular identifier; or that the instruction is prevented from fusing; or that the instruction may not be fused if a data loading operation that the instruction depends on resulted in a cache miss; or that the instruction may not fuse if there is too much wait time for the instruction to be dispatched; or that the instruction is to be deprioritized. The fusion tag of an instruction may also not specify a condition, thereby letting the execution computing device determine whether to fuse the instruction with another.

In FIG. 1, the fusion tags of instructions "i1", "i2", "i4", and "i7" (illustrated as "T1", "T2", "T3", and "T7") specify conditions for instruction fusion while the fusion tags for instructions "i0", "i3", "i5", and "i6" do not specify conditions for instruction fusion. The execution computing device 104 determines whether to fuse instructions "i1", "i2", "i4", and "i7" based on the fusion tags "T1", "T2", "T4", and "T7". The execution computing device 104 may also determine whether to fuse instructions "i0", "i3", "i5", and "i6", albeit this determination is not based on the fusion tags of those instructions. In the example, in the fused instructions "i1" and "i2" are fused to become instruction "i1i2" based on the fusion tags "T1" and "T2". The instructions "i4" and "i7" are fused to become instruction "i4i7" based on the fusion tags "T4" and "T7". The instructions "i3" and "i5" are fused to become one fused instruction "i3i5", though this fusion is not based on fusion tags. The instructions "i0" and "i6" are not fused.

The compiling computing device 102 implements a compiler 120 and a tag generator 122. The compiler 120 compiles the source code 110 into instructions 112 and the fusion tag generator 122 provides corresponding fusion tags. The provision of fusion tags at the compiling computing device 102 is static or off-line, since compiling computing device 102 generates the fusion tags 114 based on non-real-time information that are available prior to the program being executed. In some embodiments, the fusion tag generator 122 uses a timing model 124 to generate the fusion tags 114. The timing model 124 describes the timing behavior of a target processor (the processor for which the instructions 112 are intended).

The goal of the fusion tag generation is to identify instruction fusion opportunities that may lead to improvement in efficiency. For example, the fusion tag generator 122 may identify an add instruction and a separate multiply instruction that can be fused together to become one add-multiply instruction that take advantage of the built in add-multiply hardware of the target processor to achieve gain in efficiency. The fusion tags may be used to reduce the length of critical paths by giving fusion priority to critical path instructions.

Since the executing computing device 104 may fuse instructions on its own based on dynamic real-time conditions, the fusion tag generator 122 may also use fusion tags to prevent certain instructions from being dynamically fused, lest the instruction fusion may hinder the performance of the program. For example, the fusion tags may be used to prevent issuing delay, specifically to minimize delay in issuing a fused instruction due to dependencies between instructions that are fused together.

In some embodiments, the compiler 120 and the fusion tag generator 122 are modules of software instructions being executed by one or more processing units (e.g., a processor) of the computing device 102. In some embodiments, the compiler 120 and the fusion tag generator 122 are modules of hardware circuits implemented by one or more integrated circuits (ICs) of an electronic apparatus. Though the compiler 120 and the fusion tag generator 122 are illustrated as being separate modules, some of the modules can be combined into a single module. For example, the functionalities of the fusion tag generator 122 may be merged into the compiler 120 such that the compiler uses the timing model 124 to generate the tagged instructions 116. An example computing device 800 that may implement the compiling computing device 102 will be described by reference to FIG. 8 below.

The execution computing device 104 includes an instruction fuser 130, a dispatcher 132, and an execution unit 134. The instruction fuser 130 receives the tagged instructions 116 and generates the fusion-processed instructions 118. The dispatcher 132 dispatches the fusion-processed instructions 118 to the execution unit 134 to be executed. The dispatcher 132 dispatches an instruction when the instruction's operands are ready. Thus, for a fused instruction that includes multiple constituent instructions, the dispatcher 132 has to wait for operands of all constituent instructions to be ready before dispatching the fused instruction to be executed. The execution unit 134 may include multiple processing units or multiple arithmetic logic units (ALUs) to execute the instructions, including the fused instructions, in parallel. In some embodiments, the instruction fuser 130, the dispatcher 132, and the execution unit 134 may be part of a processor or a set of processing units, with the instruction fuser 130 being part of the front-end of the processor or processing units.

For each instruction, the instruction fuser 130 uses the corresponding fusion tag to determine whether to fuse the instruction with another instruction, and if so, to identify another instruction to fuse with. The fusion tags received from the compiling computing device 102 are static, but the instruction fuser 130 may dynamically update the fusion tags based on real-time information available at the execution computing device 104, information such as whether there is a cache miss by a load operation or whether the dispatcher has waited too long for a dependent instruction to be ready. Some of the dynamic information may be provided by the dispatcher 132 or the execution unit 134. The instruction fuser 130, according to a set of fusion rules or heuristics 136, searches for a suitable pair or group of instructions to fuse into fused instructions.

In some embodiments, the instruction fuser 130, the dispatcher 132, and the execution unit 134 are modules of software instructions being executed by one or more processing units (e.g., a processor) of the computing device 104. In some embodiments, the instruction fuser 130, the dispatcher 132, and the execution unit 134 are modules of hardware circuits implemented by one or more integrated circuits (ICs) of an electronic apparatus. Though the instruction fuser 130, the dispatcher 132, and the execution unit 134 are illustrated as being separate modules, some of the modules can be combined into a single module. An example computing device 800 that may implement the execution computing device 104 will be described by reference to FIG. 8 below.

Figure 2:
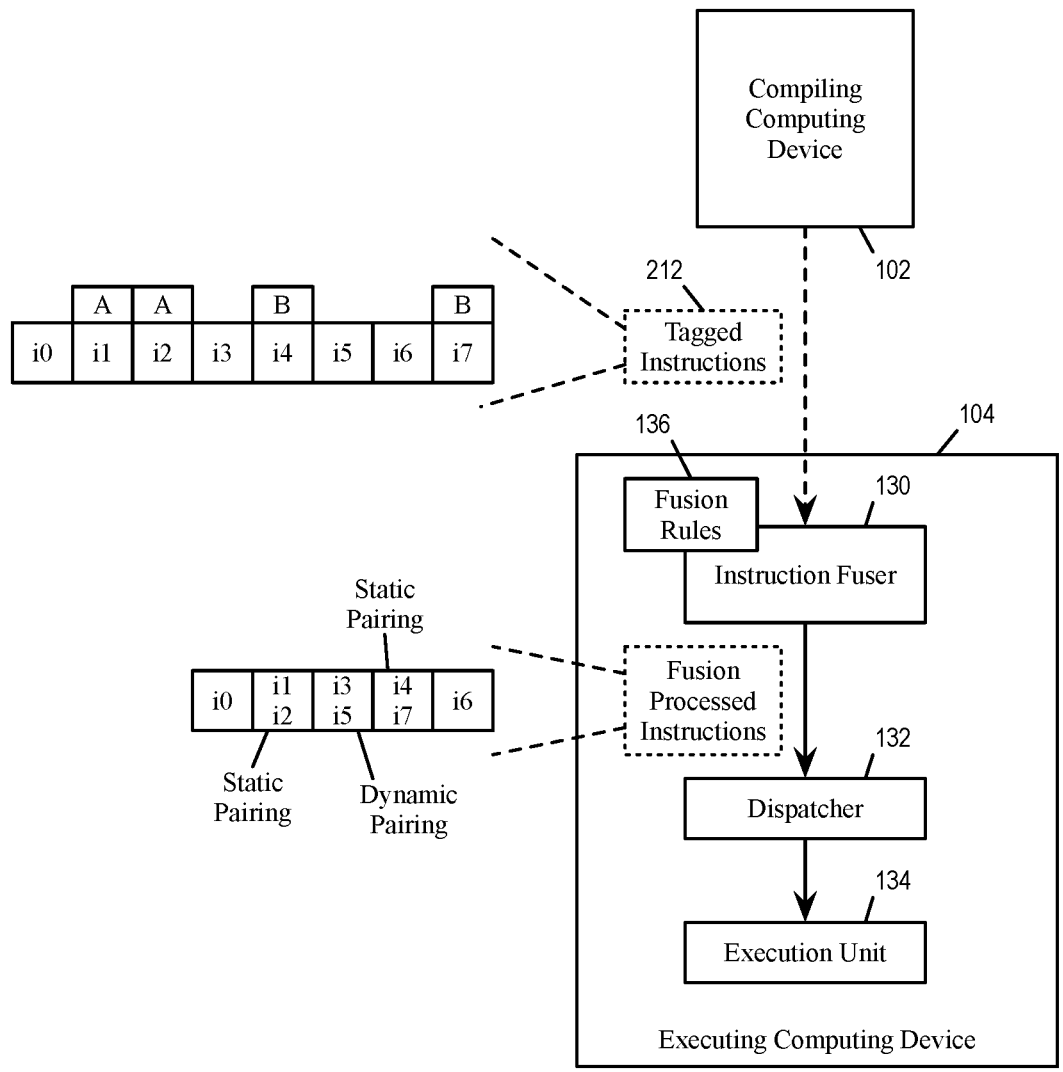
FIG. 2 conceptually illustrates fusion tags that specify a pair or a group of instructions that may be fused, consistent with an exemplary embodiment.

In some embodiments, fusion tags may be pairing tags that specify a pair or a group of instructions that may be fused. For example, if the fusion tag of a first instruction specifies a same group identifier as the fusion tag of a second instruction, then the first instruction and the second instruction may be fused. More generally, if the fusion tags of two or more instructions specify a same group identifier, those two or more instructions may be fused into one fused instruction. FIG. 2 conceptually illustrates fusion tags that specify a pair or a group of instructions that may be fused, consistent with an exemplary embodiment.

As illustrated, the execution computing device 104 receives tagged instructions 212 from the compiling computing device 102. Within the tagged instructions 212, the fusion tag for i1 and the fusion tag for i2 have a common identifier for a fusion group "A", indicating that instructions it and i2 are recommended to be fused together as one fused instruction. Likewise, the fusion tag for i4 and the fusion tag for i7 have a common identifier for a fusion group "B", indicating that instructions i4 and i7 are recommended to be fused together as one fused instruction. Based on the fusion tags for fusion group "A", the instruction fuser 130 fuses instructions i1 and i2 to generate fused instruction "i1i2". Based on the fusion tags for fusion group "B", the instruction fuser 130 fuses instructions i4 and i7 to generate fused instruction "i4i7". The fusion group identifiers can be recycled since there are only a limited number of instructions that are in-flight and are being considered for instruction fusion.

The instruction fuser 130 may decide to fuse instructions together even when the fusion tags of those instructions do not indicate a fusion group. In the example of FIG. 2, though fusion tags of instructions i3 and i5 do not share a common identifier for a fusion group, the instruction fuser 130 nevertheless fuses instructions i3 and i5 together as one fused instruction "i3i5" based on its own fusion rules or heuristics 136. Conversely, the instruction fuser 130 may also determine not to fuse instructions together based on its own fusion rules or heuristics 136, even when the fusion tags of those instructions do indicate a fusion group.

Figure 3:
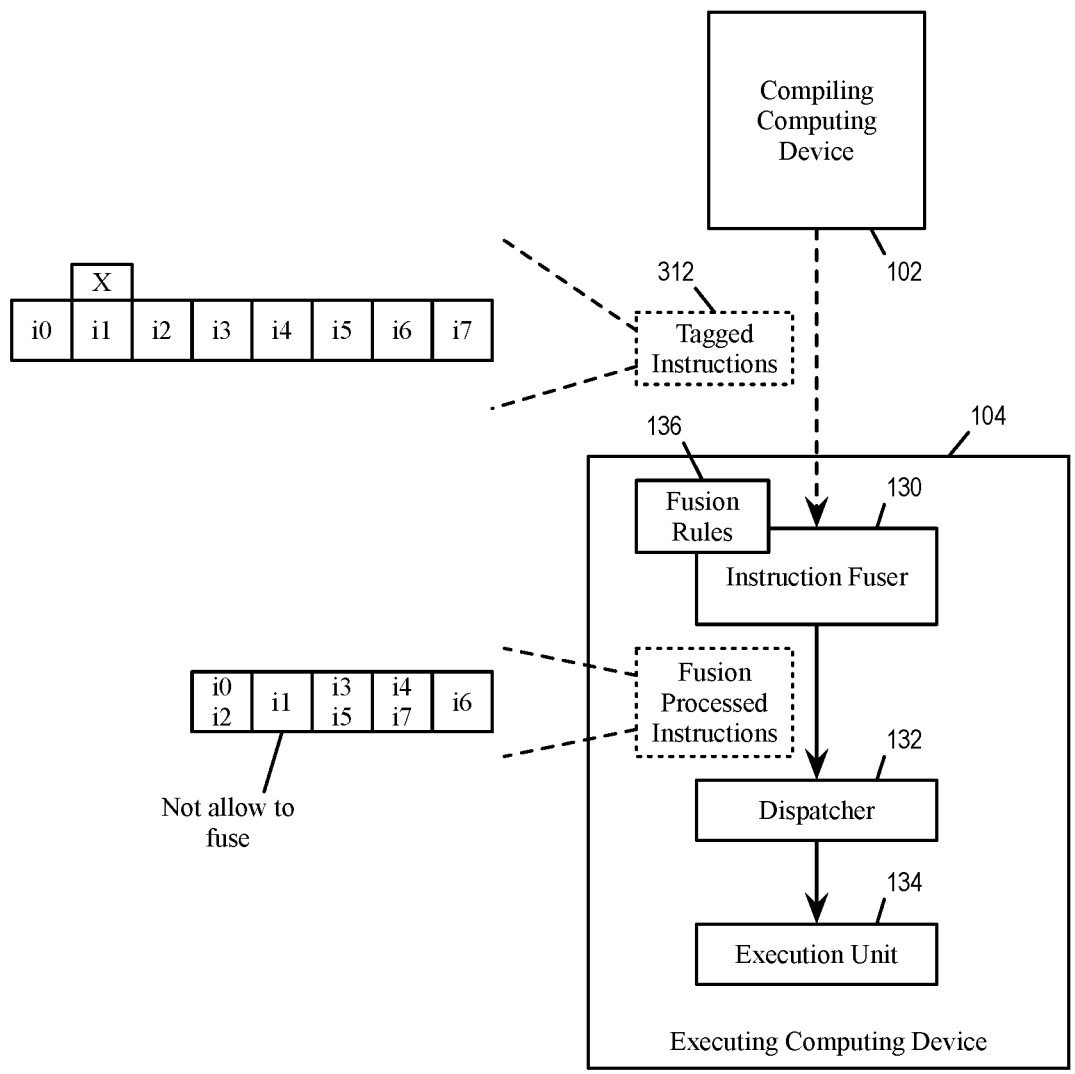
FIG. 3 conceptually illustrates a fusion tag that prevent an instruction from being fused, consistent with an exemplary embodiment.

In some embodiments, the fusion tag generator 122 may use fusion tags to prevent certain instructions from being dynamically fused lest the instruction fusion may hinder the performance of the program. FIG. 3 conceptually illustrates a fusion tag that prevents an instruction from being fused, consistent with an exemplary embodiment.

As illustrated, the execution computing device 104 receives tagged instructions 312 from the compiling computing device 102. Within the tagged instructions 312, the instruction i1 has a fusion tag that includes a fusion prevention indicator (illustrated by "X"). The prevention indicator (or prevention tag) indicates that the instruction i1 is not to be fused and has to be executed on its own. Upon receiving the instructions 312, the instruction fuser 130 based on its own heuristics and fusion rules 136 fuses instructions i0 and i2 into fused instruction "i0i2", instructions i3 and i5 into fused instruction "i3i5", and instructions i4 and i7 into fused instruction "i4i7". However, according to the fusion prevention indicator of instruction i1, the instruction fuser 130 does not fuse instructions i1 with another instruction. (The instruction fuser 130 also decides to not fuse instruction i6 based on its own fusion rules.)

In some embodiments, when dispatching a fused instruction, the dispatcher 132 waits for all operands and all constituent instructions to be ready before dispatching. However, when the instruction fuser 130 waits for too long a constituent instruction to be ready, the instruction fusion operation is hindering performance of the execution unit 134 rather than improving it.

In some embodiments, a fusion tag may be dynamically set by the execution computing device based on real-time conditions during execution of the program or application. Examples of dynamic fusion tags include wait time tag and cache miss tag. When the time between operands ready and the issuing/dispatching of an instruction is longer than a threshold time interval, the execution computing device sets the wait time tag for the same instruction in the future to prevent instruction fusion. When a load operation results in cache miss, the execution computing device sets the cache miss tags for the instructions that depend on the load instruction to prevent instruction fusion.

Figure 4:
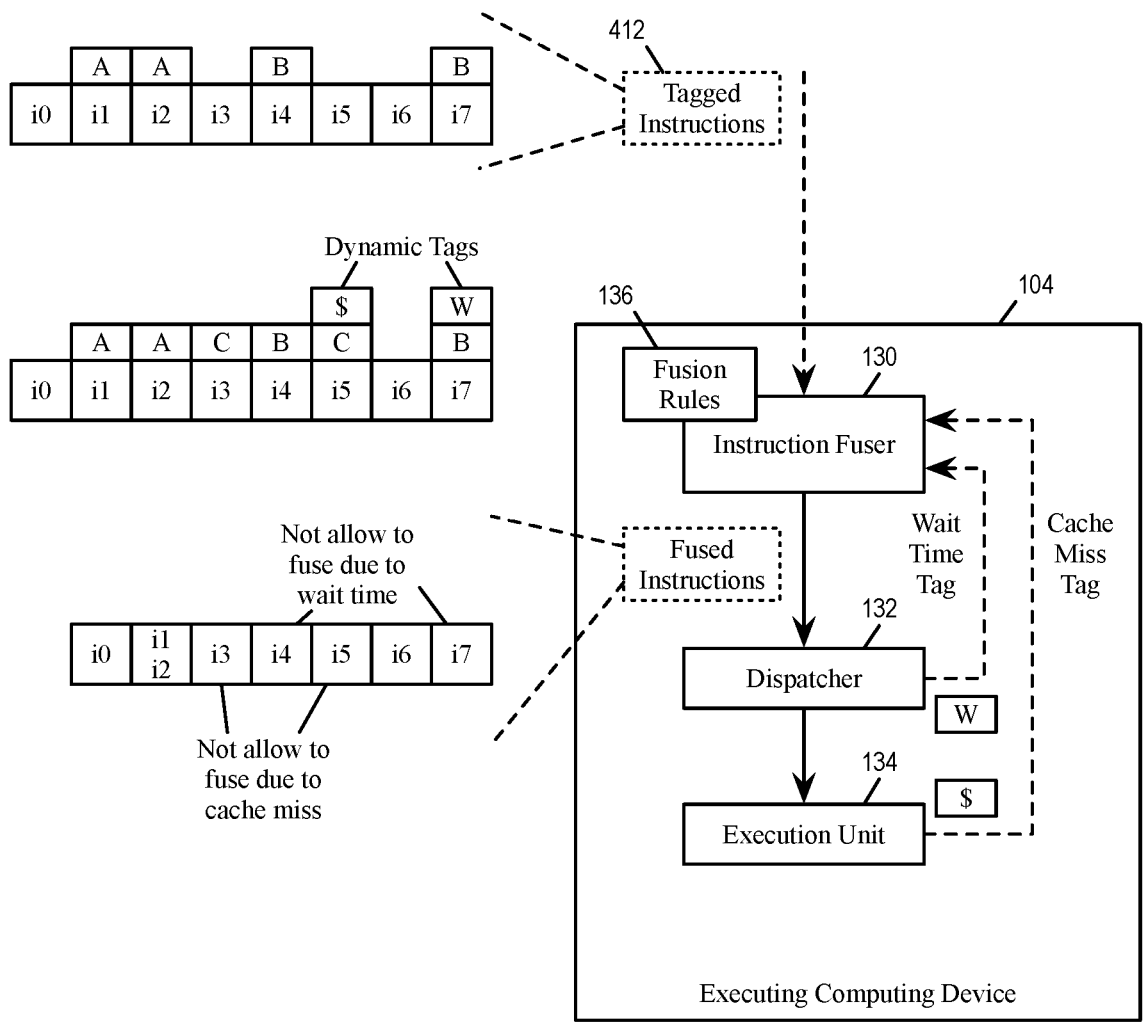
FIG. 4 conceptually illustrates dynamic fusion tags that are set according to real-time conditions of the execution computing device.

FIG. 4 conceptually illustrates dynamic fusion tags that are set according to real-time conditions of the execution computing device. As illustrated, the execution computing device 104 receives tagged instructions 412 from the compiling computing device 102. The static fusion tags of the tagged instructions 412 indicate that instructions i1 and i2 belong to a fusion group "A", instructions i4 and i7 belong to a fusion group "B", and instructions i3 and i5 belong to fusion group "C". The instruction fuser 130 fuses instruction i1 and i2 into fused instruction i1i2 for fusion group "A". However, the instruction fuser 130 does not fuse instructions i4 and i7 for fusion group "B" because of a wait time tag (illustrated by a "W"). The instruction fuser 130 also does not fuse the instruction i3 and i5 for fusion group "C" because of a cache miss tag (illustrated by a "$").

The executing computing device 104 identifies instructions that are likely to have long wait time at the dispatcher 132 and sets a wait timer and the wait time tag for those instructions. In the example of FIG. 4, the execution computing device 104 identifies instruction i7 as an instruction that is likely to have a long wait time. With the wait time tag set ("W") for instruction i7, the instruction fuser 130 knows to abort fusion operation for the instruction i7 when the wait timer expires. The instructions i4 and i7 are therefore executed separately without being fused.

In the example of FIG. 4, the execution unit 134 experienced a cache miss when it executed an earlier load instruction. The instruction i5 is an instruction that depends on the earlier load instruction for operands. Because of the cache miss, a fused instruction based on the instruction i5 would have to wait for the completion of the cache retrieval operation to execute, thereby hindering the performance of the execution unit 134. To avoid such an inefficient instruction fusion, the execution unit 134 sets a cache miss tag ("$") for the instruction i5 so it does not fuse.

In some embodiments, the dispatch of instructions that are not in the critical path are deprioritized, thereby giving higher priority to instructions on the critical path. The compiling computing device 102 may deprioritize an instruction by setting a deprioritizing tag. The execution computing device 104 prioritizes dispatch of instructions without deprioritizing tag. Moreover, the instruction fuser 130 prioritizes fusion opportunities for instructions without the deprioritizing tag. Conversely, in some embodiments, instructions that are in critical paths are prioritized. The compiling computing device 102 may prioritize an instruction by setting a prioritizing tag. The execution computing device 104 prioritizes dispatch of instructions with prioritizing tag. Moreover, the instruction fuser 130 prioritizes fusion opportunities for instructions with the prioritizing tag.

Figure 5:
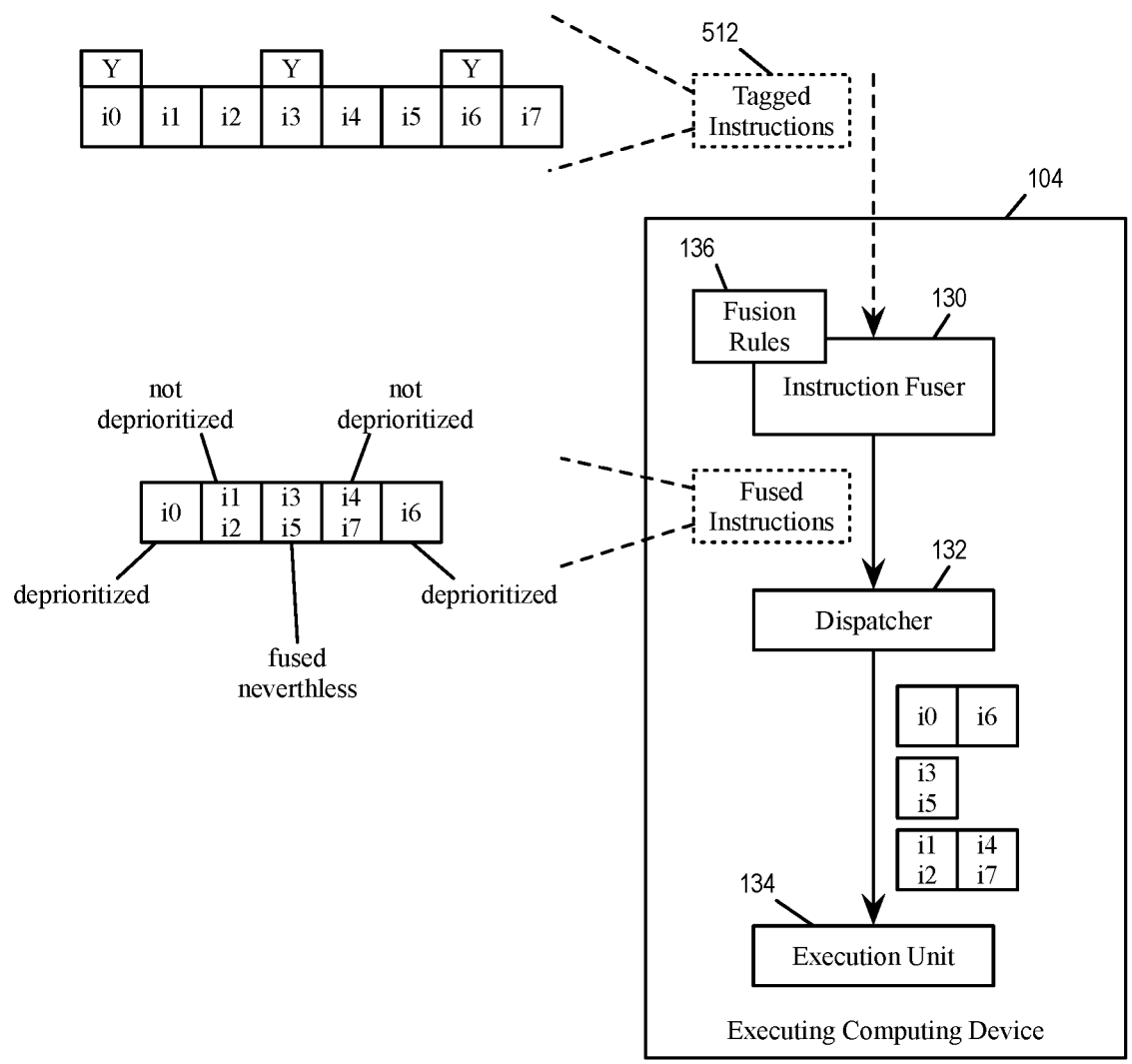
FIG. 5 conceptually illustrates fusion tags that deprioritize instructions, consistent with an exemplary embodiment.

FIG. 5 conceptually illustrates fusion tags that deprioritize instructions, consistent with an exemplary embodiment. As illustrated, the execution computing device 104 receives tagged instructions 512 from the compiling computing device 102. The static fusion tags of the tagged instructions 512 includes deprioritizing tags (illustrated as "Y") that are set for instructions i0, i3, and i6. The compiling computing device 102 sets deprioritizing tags for these instructions because they are identified as not being on the critical path based on the timing model 124.

In the example, instructions i0, i3, and i6 are deprioritized by deprioritizing tags. As a result, the instruction fuser 130 prioritizes the fusion of other instructions that do not have deprioritizing tags, e.g., the instructions i1, i2, i4, i5, and i7. The instructions i1, i2, i4, and i7 are fused to generate fused instructions "i1i2" and "i4i7". The instruction i5 is also fused (with the instruction i3 to generate fused instruction "i3i5", even though instruction i3 is deprioritized). The dispatcher 132 dispatches instructions that are not deprioritized before instructions that are deprioritized. In the example, instruction "i1i2" is dispatched first, then "i4i7", then "i3i5", then "i0", then "i6". Instructions based on i0, i3, and i6 are dispatched later because they are deprioritized.

Figure 6:
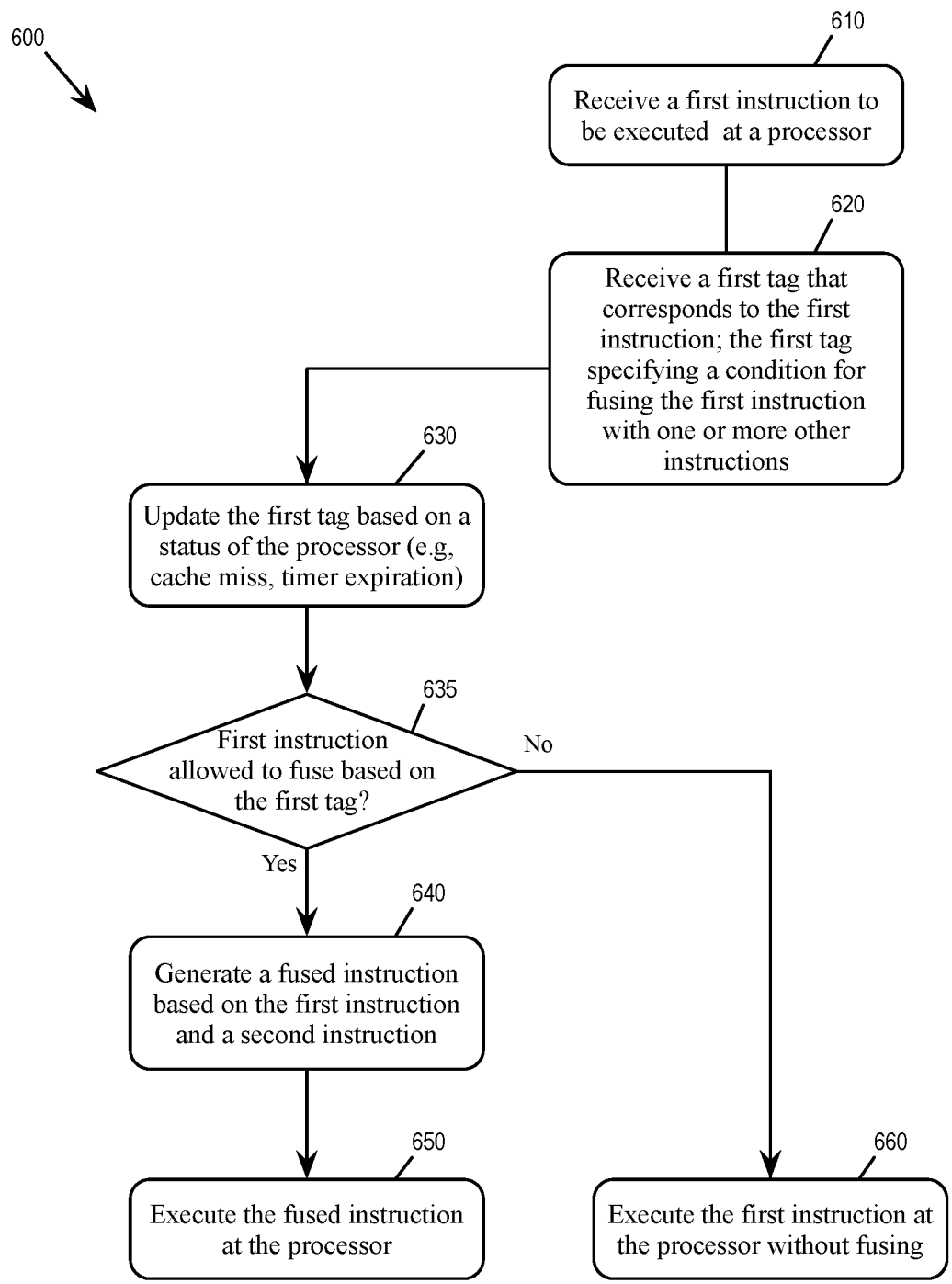
FIG. 6 conceptually illustrates a process for fusing instructions based on fusion tags that specify the conditions by which the instructions can be fused, consistent with an exemplary embodiment.

FIG. 6 conceptually illustrates a process 600 for fusing instructions based on fusion tags that specify the conditions by which the instructions can be fused, consistent with an exemplary embodiment. In some embodiments, one or more processing units (e.g., processor) of the execution computing device 104 perform the process 600 by executing instructions stored in a computer readable medium. In some embodiments, one or more circuits of the executing computing device 104, e.g., at the front-end of a processor, are configured to perform the process 600.

The execution computing device receives (at step 610) a first instruction to be executed at a processor. The first instruction is part of a set of instructions generated by a compiler based on a source code. The execution computing device also receives (at step 620) a first fusion tag that corresponds to the first instruction. In some embodiments, fusion tags are extra bits that are appended to their corresponding instructions such that the first fusion tag accompanies the first instruction through at least part of the data path or some of the pipeline stages. The first fusion tag specifies a condition for fusing the first instruction with one or more other instructions. The first fusion tag may be statically generated by the compiler based on a timing model. Such a condition may specify that the instruction is to be fused with another instruction sharing a particular identifier, or that the instruction is prevented from fusing, or that the instruction is to be deprioritized for fusing with other instructions. The first fusion tag may also not specify a condition, thereby leaving it entirely to the execution computing device to determine whether to fuse the instruction with another.

The execution computing device updates (at step 630) the first fusion tag based on a status of the processor. The executing computing device may dynamically update the fusion tag of each instruction based on real-time information during execution. For example, the updated first fusion tag may specify that the first instruction may not be fused if an earlier data loading operation that the first instruction depends on resulted in a cache miss, or that the updated first fusion tag may specify that the first instruction may not fuse with another instruction if the first instruction is expected to impose too much wait time (e.g., longer than a threshold time).

The execution computing device determines (at step 635) whether the first instruction is allowed to fuse with another instruction based on the first fusion tag. For example, if the first fusion tag specifies that the first instruction is to be fused with another instruction sharing a particular identifier, the execution computing device may allow the first instruction to fuse with a second instruction having a second fusion tag that has the particular identifier. As another example, if the first fusion tag specifies that the instruction is prevented from fusing, the execution computing device may prevent the first instruction from fusing with any instruction. The execution computing device may also allow or disallow the first instruction to fuse with another instruction based on its own fusion rules or heuristics even if the first fusion tag does not specify any condition for allowing or disallowing instruction fusion.

If the first instruction is allowed to fuse, the process proceeds to 640 to generates a fused instruction based on the first instruction and a second instruction and to execute (at step 650) the fused instruction at the processor. If the first instruction is not allowed to fuse, the process proceeds to 660 to execute the first instruction without fusing it with another instruction.

Figure 7:
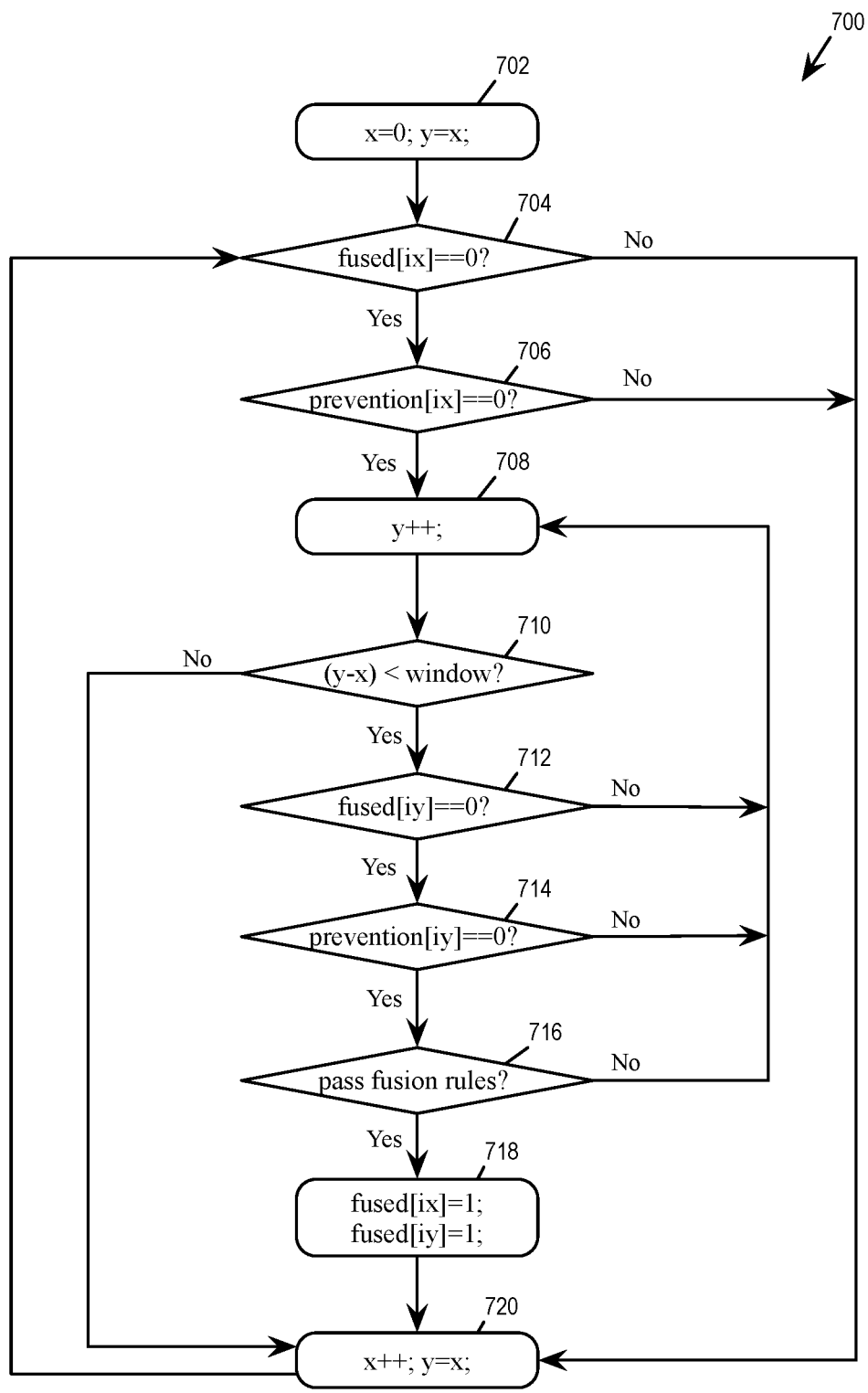
FIG. 7 conceptually illustrates an example algorithm for identifying two instructions to be fused.

FIG. 7 conceptually illustrates an example algorithm 700 for identifying two instructions to be fused. The algorithm examines the fusion tags of several in-flight instructions to search for two closest instructions that can satisfy the fusion rules and be fused. The algorithm 700 also guarantees that an instruction with its fusion prevention tag set is not grouped or fused with another instruction. The execution computing device 104 may use the algorithm 700 when performing the process 600 at the steps 635 and 640.

As illustrated, the algorithm 700 defines a first index x and a second index y to identify a first instruction ix and a second instruction iy, respectively. The first index and the second index are initially set to be the same (block 702). If the first instruction is already fused (block 704) or if the first instruction has a fusion prevention tag (block 706), the algorithm moves on to examine other instruction pairs (block 720). If the first instruction is not fused and has no fusion prevention tag, the algorithm increments the second index (block 708) to look for a second instruction that can be fused with the first instruction. If the incremented second index is beyond a certain window of the first index (block 710), the algorithm moves on to look at other possible instruction pairs (block 720). If the incremented second index is within the window of the first index, the algorithm determines whether the second instruction satisfies certain conditions. Specifically, the second instruction is allowed be fused with the first instruction as a fusion pair if the second instruction is not fused (block 712), has no fusion prevention tag (block 714), and passes fusion rules (block 716). If the second instruction fails any of these conditions, the algorithm increments the second index (block 708) to look for another second instruction that can be fused with the first instruction. If the second instruction meets these conditions, the first and second instructions are to be fused as one instruction (block 718), and the first index is incremented to look for another first instruction for another grouping or pairing of instructions.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 6 and 7) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
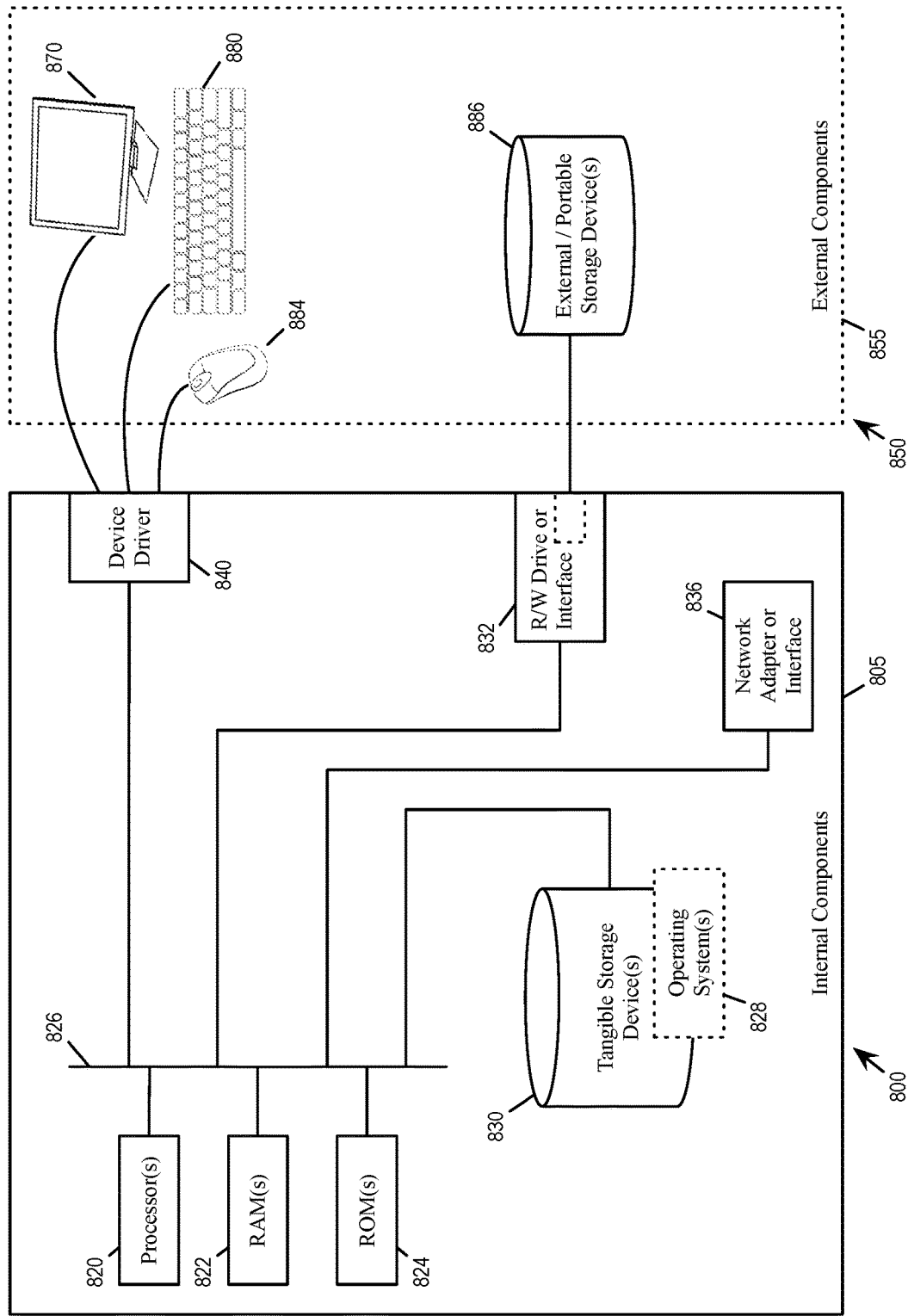
FIG. 8 shows a block diagram of the components of a data processing system in accordance with an illustrative embodiment of the present disclosure.

FIG. 8 shows a block diagram of the components of data processing systems 800 and 850 that may be used to implement the compiling computing device 102 or the execution computing device 104 for an instruction fusion system, in accordance with an illustrative embodiment of the present disclosure. It should be appreciated that FIG. 8 provides only an illustration of one implementation and does not imply any limitations with regard to the environments in which different embodiments may be implemented. Many modifications to the depicted environments may be made based on design and implementation requirements.

Data processing systems 800 and 850 are representative of any electronic device capable of executing machine-readable program instructions. Data processing systems 800 and 850 may be representative of a smart phone, a computer system, PDA, or other electronic devices. Examples of computing systems, environments, and/or configurations that may represented by data processing systems 800 and 850 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 800 and 850 may include a set of internal components 805 and a set of external components 855 illustrated in FIG. 8. The set of internal components 805 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the programs for executing the processes 600 and 700 are stored on one or more computer-readable tangible storage devices 830 for execution by one or more processors 820 via one or more RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 805 also includes a R/W drive or interface 832 to read from and write to one or more portable computer-readable tangible storage devices 886 such as a CD-ROM, DVD, memory stick, magnetic tape, magnetic disk, optical disk or semiconductor storage device. The instructions for executing the processes 600 and 700 can be stored on one or more of the respective portable computer-readable tangible storage devices 886, read via the respective R/W drive or interface 832 and loaded into the respective hard drive 830.

The set of internal components 805 may also include network adapters (or switch port cards) or interfaces 836 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 836. From the network adapters (or switch port adaptors) or interfaces 836, the instructions and data of the described programs or processes are loaded into the respective hard drive 830. The network may comprise copper wires, optical fibers, wireless transmission, routers, firewalls, switches, gateway computers and/or edge servers.

The set of external components 855 can include a computer display monitor 870, a keyboard 880, and a computer mouse 884. The set of external components 855 can also include touch screens, virtual keyboards, touch pads, pointing devices, and other human interface devices. The set of internal components 805 also includes device drivers 840 to interface to computer display monitor 870, keyboard 880 and computer mouse 884. The device drivers 840, R/W drive or interface 832 and network adapter or interface 836 comprise hardware and software (stored in storage device 830 and/or ROM 824).

The foregoing one or more embodiments implements an instruction fusion system within a computer infrastructure by having one or more computing devices. A compiling computing device generates fusion tags based on a timing model along with compiled instructions. An execution computing device uses the fusion tags to determine whether to fuse instructions and to execute the fused instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a first instruction to be executed at a processor;
   receiving a first fusion tag that corresponds to the first instruction, the first fusion tag specifying a condition for fusing the first instruction with one or more other instructions;
   determining whether the first instruction is allowed to fuse with a second instruction based on the first fusion tag; and
   upon determining that the first instruction is allowed to fuse with the second instruction:
      generating a fused instruction based on the first instruction and the second instruction; and
      executing the fused instruction at the processor, wherein the first fusion tag specifies that the first instruction is not allowed to fuse with the second instruction based on at least one of:
   if a wait time between the first instruction and the second instruction is greater than a threshold time interval; or
   if a load operation that the first instruction logically depends on results in a cache miss.

2. The computer-implemented method of claim 1, further comprising modifying the first fusion tag based on a real-time condition of the processor.

3. The computer-implemented method of claim 1, wherein the second instruction is identified based on the first fusion tag and a real-time condition at the processor.

4. The computer-implemented method of claim 1, further comprising receiving a second fusion tag that corresponds to the second instruction, wherein the first fusion tag and the second fusion tag share an identifier of a group that includes both the first instruction and the second instruction.

5. The computer-implemented method of claim 1, wherein the first fusion tag allows the first instruction to be fused with another instruction sharing a same identifier.

6. The computer-implemented method of claim 1, wherein the first fusion tag prevents the first instruction from fusing with another instruction.

7. The computer-implemented method of claim 1, wherein the first fusion tag specifies that instructions other than the first instruction have priority for instruction fusion and execution over the first instruction.

8. The computer-implemented method of claim 1, wherein the fused instruction is generated based on the first instruction and one or more subsequent instructions.

9. A computing device comprising:
   a processor; and
   one or more circuits configured to perform acts comprising:
      receiving a first instruction to be executed at the processor;
      receiving a first fusion tag that corresponds to the first instruction, the first fusion tag specifying a condition for fusing the first instruction with one or more other instructions and specifying that instructions other than the first instruction have priority for instruction fusion and execution over the first instruction;
      determining whether the first instruction is allowed to fuse with a second instruction based on the first fusion tag; and
      upon determining that the first instruction is allowed to fuse with the second instruction:
         generating a fused instruction based on the first instruction and the second instruction; and
         executing the fused instruction at the processor.

10. The computing device of claim 9, wherein the one or more circuits are further configured to perform acts comprising:
   modifying the first fusion tag based on a real-time condition of the processor.

11. The computing device of claim 9, wherein the second instruction is identified based on the first fusion tag and a real-time condition at the processor.

12. The computing device of claim 9, wherein the one or more circuits are further configured to perform acts comprising:
   receiving a second fusion tag that corresponds to the second instruction, wherein the first fusion tag and the second fusion tag share an identifier of a group that includes both the first instruction and the second instruction.

13. The computing device of claim 9, wherein the first fusion tag prevents the first instruction from fusing with another instruction.

14. The computing device of claim 9, wherein the first fusion tag specifies that the first instruction is not allowed to fuse with the second instruction if a wait time between the first instruction and the second instruction is greater than a threshold time interval.

15. The computing device of claim 9, wherein the first fusion tag specifies that the first instruction is not allowed to fuse with another instruction if a load operation that the first instruction logically depends on results in a cache miss.

16. A computer program product comprising:
   one or more non-transitory computer-readable storage devices and program instructions stored on at least one of the one or more non-transitory storage devices, the program instructions executable by a processor, the program instructions comprising sets of instructions for:
   receiving a first instruction to be executed at the processor;
   receiving a first fusion tag that corresponds to the first instruction, the first fusion tag specifying a condition for fusing the first instruction with one or more other instructions and specifying that instructions other than the first instruction have priority for instruction fusion and execution over the first instruction;
   determining whether the first instruction is allowed to fuse with a second instruction based on the first fusion tag; and
   upon determining that the first instruction is allowed to fuse with the second instruction:
      generating a fused instruction based on the first instruction and the second instruction; and
      executing the fused instruction at the processor.

17. The computer program product of claim 16, wherein the program instructions further comprise sets of instructions for:
   receiving a second fusion tag that corresponds to the second instruction, wherein the first fusion tag and the second fusion tag share an identifier of a group that includes both the first instruction and the second instruction.

* * * * *